Patented Feb. 3, 1942

2,272,071

UNITED STATES PATENT OFFICE 2,272,071

SPARK PLUG INSULATOR

Frank H. Riddle, Detroit, and Leonard G. Tait, St. Clair Shores, Mich., assignors, by mesne assignments, to Champion Spark Plug Company, Toledo, Ohio, a corporation of Delaware No Drawing. Application March 10, 1938, Serial No. 195,106

3 Claims. (Cl. 106—46)

This invention relates to insulating material and a method of making the same, the material being especially suitable for spark plug insulators and uses requiring similar qualities.

A satisfactory spark plug insulator must retain its insulating quality at high temperatures, must be resistant to heat shock in view of the violent temperature changes to which it is subjected, must have sufficient heat conductivity to prevent the portion within the firing chamber from becoming so hot as to cause pre-firing, must have high mechanical strength and should have high thermal-expansion relative to ordinary ceramic material, since it is customarily employed in conjunction with metal parts having coefficients of thermal-expansion higher than ordinary ceramic materials.

A properly made product consisting substantially of recrystallized alumina combines these various requirements to a very great extent. There are other materials which have some of these desirable characteristics to an even higher degree than alumina, but these other materials accompany their good qualities with others which are not so desirable. It has been difficult to produce a properly formed alumina insulating body at a price making it competitive for spark plug purposes. One of the principal difficulties has been the high temperature required for properly firing an alumina body.

It is, of course, well known that the firing temperature of ceramic materials can be lowered by various fluxes, but the addition of the ordinary fluxes to alumina for the purpose of lowering the firing temperature results deleteriously upon the desirable characteristics of the finished product. Some fluxes are injurious because of deleterious effect upon one desirable quality of the resulting product and others because of deleterious effects upon other qualities of the product.

It has been found that substantially pure alkaline earth fluxes, such as magnesia or whiting, produce a marked reduction in the firing temperature of an alumina body without detracting from the good qualities of the resultant insulating material. In fact, when used in proper small quantities, the addition of these materials renders the proper recrystallization of the alumina much more reliable, so that in fact the resultant product is improved from a practical standpoint. Of course, it is readily understood that, to be satisfactory in use, material must be sufficiently uniform so that the poorer of portions thereof are still up to standard in use, otherwise the product cannot be made commercially satisfactory even though individual examples of very satisfactory insulators could be made.

Whiting is a very readily obtainable calcium compound which can be added to purified alumina grains to reduce the firing temperature. Other sources of calcium oxide or other calcium compounds free from alkali or other deleterious ingredients may be employed if more convenient, as will be readily understood, but, for convenience, the addition of whiting will be discussed as generic to such compounds. The addition of 2% of whiting has a material effect upon lowering the firing temperature of alumina and assists in the recrystallization and insures a more uniform product. Further reduction in firing temperatures and improvements in some respects result from increased addition of whiting up to 10%, but these larger amounts of whiting accelerate the crystallization to such an extent that the product may not have the desired fine-grained structure. It is preferable, therefore, to employ about 2% of whiting and not over 5% thereof, although under some circumstances, as indicated, up to 10% may be employed.

Magnesia likewise has an effect somewhat similar to that described in connection with whiting. The magnesia may be obtained from various sources, such as the sintered or fused magnesia, or brucite may be employed. The magnesium compounds do not appear to have as marked an effect upon the crystal growth as the calcium compounds and may be employed in larger quantities. Although 2% of magnesia has a noticeable effect, it is preferable to use at least 4% of magnesia and greater amounts up to 10% may be employed.

While magnesia and whiting may be used separately and each have its desirable effect, it is found that they have a more marked effect when employed together and without resulting in difficulties which may arise from using calcium compounds in too large quantities. The preferred mixture, therefore, is purified alumina about 94%, whiting 2%, magnesia 4%. If brucite or other source of magnesia is employed, it may be used in a quantity resulting in an equivalent amount of magnesia.

Other alkaline earth compounds may be employed with or in place of compounds of magnesium and calcium, since these compounds have the common property of reducing the firing temperature without injuriously affecting the high hot dielectric, as is done by sodium compounds, for example. However, the other compound of this group which has been found most advantageous is a compound of beryllium. This may be added as beryl, if desired. Where beryl is used in conjunction with compounds of magnesium and calcium, such as described above, it is preferred to employ about one per cent of beryl. That is, a mixture of these materials approximately in the proportion of four of magnesia to two of writing to one of beryl is found highly desirable.

For best results the grinding, mixing and firing should be conducted so that the resultant insulator will be substantially nonporous. This is advantageous because any pores in the insulator are detrimental, since they reduce the insulating quality and reduce heat conductivity, among their detrimental effects. One desirable way of preparing bodies from a mixture such as described, is to mix the materials with sufficient liquid to form a slip and then spray the slip into fine drops and then dry the spray into pellets. These pellets of the mixed materials can then be poured into a suitable mold and pressed therein, preferably under hydrostatic pressure. This produces a body of uniform composition and density, so that when fired the different portions of the body all reach maturity at substantially the same point. In this way, the body can be readily fired so that the material is recrystallized and forms a solid, nonporous product without reaching the molten stage or such a softened stage that there is danger of deformation.

The above is disclosed and claimed in a co-pending application of Frank H. Riddle, Serial No. 195,107, filed March 10, 1938, and is not claimed herein.

It has been found that other additions may be made to the alkaline earth compounds mentioned above without detracting from the desirable qualities of the insulator, and, in fact, slightly increase such desirable qualities, while further reducing the firing temperature.

Zirconium compounds have been suggested hitherto as desirable ingredients in spark plug cores and the like, but not as additions which would decrease the firing temperature of other compounds. It has been found that an addition of zirconium compounds to a substantially pure alumina body reduces the firing temperature, and when added in small amounts for that purpose does not deleteriously affect the desirable qualities of the resultant insulating body. Where high percentages of zirconium compounds are employed the heat conductivity does not appear to be as high as it is in the more nearly pure alumina compositions. The most readily available zirconium compound which is useful for this purpose is zircon. In the small amounts which we find desirable the impurities found in ordinary deposits of zircon do not injuriously affect the resulting body, but, of course, if such impurities were excessive the mineral might be somewhat purified in any known or desired manner before adding to the mixture. It has been found that with four parts of magnesia, two parts of whiting, and one part of beryl, two parts of zircon can be used quite advantageously.

It has also been found that a small amount of boric acid may be employed, not only without detriment, but with an apparent beneficial effect upon the insulating qualities of the resulting body, as well as further lowering the firing temperature. In a mixture such as that described above 1% of boric acid may be used to advantage. Of course, some variations may be made in this proportion, but that stated has been found advantageous.

For mineralizing essentially alumina bodies, we prefer, therefore, to employ a mixture of the following ingredients in about the stated proportions, or their equivalents:

|  | Parts |
|---|---|
| Magnesia | 4 |
| Whiting | 2 |
| Zircon | 2 |
| Beryl | 1 |
| Boric acid | 1 |

Very satisfactory results have been obtained by employing these mineralizers in the proportions mentioned to constitute a total of 10% of the body with 90% of alumina. If the total quantity of mineralizers is increased or decreased, however, it is preferred to make this increase or decrease substantially proportional amongst the various constituents thereof. Also, where alumina constitutes the major portion of the body, and other relatively inert refractory materials are employed which do not directly react with this major portion of alumina, or with the mineralizing ingredients mentioned, the proportion of mineralizers to alumina may be maintained, the mineralizers merely being decreased in the same proportion that the alumina is decreased. This procedure, for example, may be followed in connection with a body consisting mainly of alumina with additions of mineralizers and of mullite material in accordance with a co-pending application of Frank H. Riddle.

The foregoing description has been based upon the supposition that the alumina employed would be substantially pure. For purposes of fabrication a dense grade of alumina is preferable. Silica is sometimes present as an impurity in alumina, and in limited amounts is not harmful, and for some purposes is somewhat beneficial. It may be tolerated, therefore, as an impurity with the alumina in limited quantities, and also may be introduced, if desired, in combination with the alkaline earth compounds. For example, some of the magnesia, at least, may be introduced as talc. However, silica should not be introduced as an impurity or otherwise in such quantities or in such a way that it will remain uncombined in the finished product.

It will be seen, therefore, that we have developed a mineralizing mixture which is particularly suitable for use in lowering the firing temperature of an alumina spark plug body, and that the amounts and proportions of the ingredients of the mineralizer may be readily ascertained from the proportion of alumina in the body, whether or not there are other ingredients which do not directly affect this proportion.

What we claim is:

1. A ceramic bath for producing electric insulating material the major portion of which consists of alumina and mineralizing material for the alumina, the mineralizing material consisting of alkaline earth metal compounds, compounds of zircon, and boric acid, the zircon constituting about one-fifth of the mineralizing material and the boric acid constituting about one-tenth of the mineralizing material, and the mineralizing material being about one-ninth as much as the alumina.

2. A ceramic batch for producing electric insulating material comprising alumina and mineralizers in approximately the following proportions:

| | Per cent |
|---|---|
| Alumina | 90 |
| Magnesia | 4 |
| Whiting | 2 |
| Zircon | 2 |
| Beryl | 1 |
| Boric acid | 1 |

3. A ceramic batch for producing electric insulating material the major portion of which consists of alumina and mineralizers in approximately the following proportions:

| | Per cent |
|---|---|
| Alumina | 90 |
| Magnesia | 4 |
| Whiting | 2 |
| Zircon | 2 |
| Beryl | 1 |
| Boric acid | 1 |

FRANK H. RIDDLE.
LEONARD G. TAIT.